No. 658,105. Patented Sept. 18, 1900.
C. B. DURYEA.
APPARATUS FOR TREATING STARCH.
(Application filed Dec. 13, 1899.)
(No Model.)
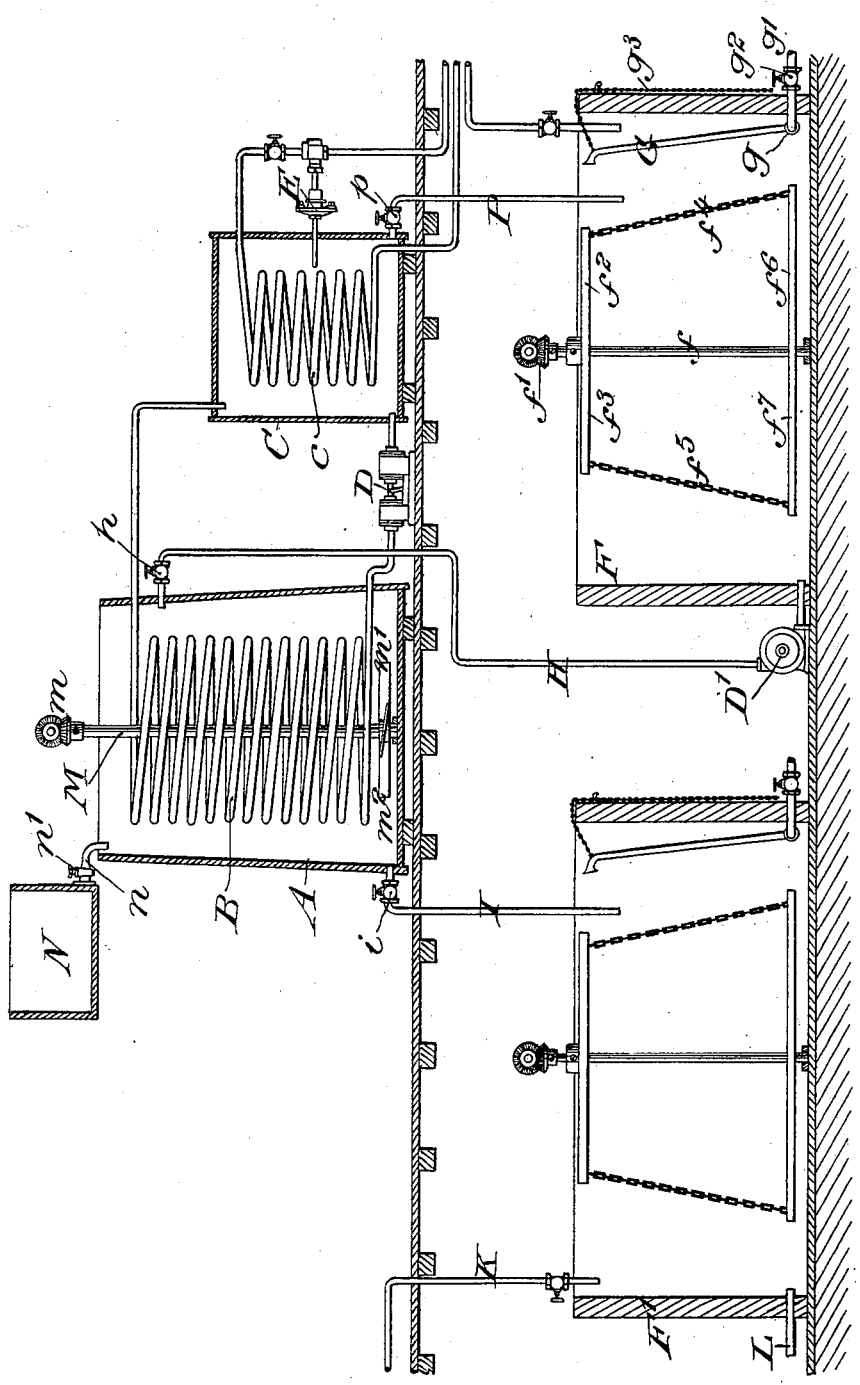
Witnesses:
George Barry Jr.
Edward Vresek.
Inventor:
Chester B. Duryea
By Brown & Seward
his Attorneys

United States Patent Office.

CHESTER B. DURYEA, OF NEW YORK, N. Y.

APPARATUS FOR TREATING STARCH.

SPECIFICATION forming part of Letters Patent No. 658,105, dated September 18, 1900.

Original application filed January 12, 1899, Serial No. 701,909. Divided and this application filed December 13, 1899. Serial No. 740,149. (No model.)

*To all whom it may concern:*

Be it known that I, CHESTER B. DURYEA, a citizen of the United States, and a resident of the borough of Manhattan, in the city and State of New York, have invented a new and useful Apparatus for Manufacturing Thin Boiling Starch, of which the following is a specification.

My invention relates to apparatus for manufacturing thin boiling starch, with the object in view of providing simple and effective means for handling the starch during its treatment with acid.

My present application is a division of my pending application, Serial No. 701,909, filed January 12, 1899, which describes and claims a method of manufacturing thin boiling starch which may be carried into practical effect by the apparatus made the subject-matter of this present application.

In the accompanying drawing, representing the apparatus, the connected and coacting parts are shown in vertical section.

A represents the converter, in which the starch is held in suspension while being treated with the acid, and the particular means for maintaining the temperature within the converter A at a predetermined degree is here shown as a pipe-coil B for the circulation of a heating liquid. The heating liquid which I prefer to use is hot water, and the opposite ends of the pipe-coil B communicate directly with the interior of a closed hot-water tank C. A force-pump (shown diagrammatically at D) is connected with the pipe of the coil B in order to maintain the circulation of heating liquid from the tank C through the pipe-coil. The liquid in the tank C is maintained at the desired temperature, preferably by means of a steam-coil $c$ within the tank C, the control of the steam to the coil $c$ from a source of supply (not shown) being determined by a thermostat or regulator E of any well-known or approved form.

A tank F for receiving the starch to be treated is provided with an agitator consisting, in the present instance, of an upright shaft $f$, provided with gear $f'$, driven from a source of power, (not shown,) and further provided with laterally-extending arms $f^2 f^3$, secured to rotate with the shaft and having suspended by chains $f^4 f^5$ at their opposite ends arms $f^6 f^7$, loosely connected with the shaft $f$. The tank F is further provided with a draw-off tube G, pivotally connected at its lower end, as at $g$, with an exit-pipe $g'$, provided with a stop-cock $g^2$, the said draw-off tube G being suspended at its upper end by means of a chain or cord $g^3$ to permit its free open end to be lowered within the tank to draw off the liquid as far as desired. From the tank F a pipe H leads to the converter A and is provided with a force-pump (shown diagrammatically at D') for forcing the contents or a portion of the contents of the tank F into the converter A at pleasure. The force-pump D' is driven from a source of power not shown. The pipe H is provided with a stop-cock $h$.

A second tank F' for receiving the treated starch from the converter A is fitted with an agitator and draw-off tube in a manner quite similar to the tank F, hereinabove described. A pipe I leads from the bottom of the converter A to the tank F' and is provided with a stop-cock $i$. The pipe K for the admission of water to the tank F' for washing the treated starch leads to the tank F' from a supply (not shown) and is provided with a draw-off pipe L.

The converter A is provided with an agitator comprising an upright shaft M, provided with gear $m$, by means of which it is driven from a source of power. (Not shown.) The shaft M is further provided, in the present instance, at a point below the coil B with blades $m' m^2$, preferably made somewhat like propeller-blades, for the purpose of keeping the mass within the converter constantly and thoroughly agitated.

The acid may be contained in a properly-diluted state in a tank N, located conveniently with respect to the converter A, so that the proper charge may be drawn from the tank N through its spout $n$ into the converter A. A cock $n'$ is provided to control the flow of dilute acid into the converter.

The apparatus is practically operated as follows: The starch to be treated is put in suspension in water in the tank F, the water employed for this purpose being preferably warm water, which may be drawn through a pipe P, provided with a stop-cock $p$, from the tank C when the hot water is used as the heat- -ing medium for the coil B. The reason for using the warm water for putting the starch first in suspension is that it materially reduces the time required for raising the charge in the converter to a temperature of greatest efficiency. When the starch has become thoroughly commingled with the water in suspension and the lumps thoroughly broken up, a charge is forced by the pump D' from the tank F into the converter A. The proper percentage of acid is then drawn from the tank N into the converter A, and while the mass is kept thoroughly agitated the temperature of the mass within the tank is raised to from 55° to 60° centigrade and maintained at about that temperature by the action of the pump D forcing the heating liquid from the tank C through the coil B until the operation of acid treatment is completed. The circulation of the heating liquid is then stopped, and the charge is drawn from the converter A into the washing-tank F', where it is washed one or more times with cold water drawn into the tank through the pipe K. After the acid has been removed from the starch enough clear water is introduced to cause it to flow through the exit-pipe L into the molds or driers, as is usual.

What I claim is—

1. Apparatus for manufacturing thin boiling starch comprising a converter for containing the starch held in suspension, an agitator for thoroughly agitating the charge within the converter, means for supplying a heating liquid, means for circulating the heating liquid within the converter to maintain a desired temperature within the converter, means for keeping the heating liquid at a predetermined temperature, means for introducing acid into the converter and means for drawing the charge from the converter, substantially as set forth.

2. The apparatus for manufacturing thin boiling starch comprising a tank for preparing the starch in suspension, an agitator within the tank, a converter for holding the starch in suspension during its treatment, means for forcing the charge from the preparing-tank to the converter, means for supplying acid to the converter, means for agitating the charge within the converter, a tank for containing a heating liquid, means for heating the liquid within the tank, means for circulating the heating liquid in proximity to the charge within the converter, a tank for receiving the starch after treatment, an agitator within the tank, means for drawing the charge from the converter into the said receiving-tank and means for delivering water into the receiving-tank, substantially as set forth.

In testimony that I claim the foregoing as my invention I have signed my name, in presence of two witnesses, this 27th day of November, 1899.

CHESTER B. DURYEA.

Witnesses:
 FREDK. HAYNES,
 EDWARD VIESER.